United States Patent [19]

Sashiki et al.

[11] Patent Number: 4,609,058
[45] Date of Patent: Sep. 2, 1986

[54] COMBINATORIAL WEIGHING METHOD AND APPARATUS THEREFOR

[75] Inventors: Takashi Sashiki, Nagaokakyo; Keiko Sakaeda, Kyoto, both of Japan

[73] Assignee: Kabushiki Kaisha Ishida Koki Seisakusho, Kyoto, Japan

[21] Appl. No.: 533,975

[22] Filed: Sep. 20, 1983

[30] Foreign Application Priority Data

Sep. 20, 1982 [JP] Japan .................................. 57-163698

[51] Int. Cl.⁴ ...................... G01G 19/00; G01G 19/22; G01G 19/52; G01G 13/00
[52] U.S. Cl. .......................................... 177/1; 177/25; 177/50; 177/63
[58] Field of Search ............... 177/1, 25, 50, DIG. 12, 177/45, 63

[56] References Cited

U.S. PATENT DOCUMENTS

| | | |
|---|---|---|
| 3,004,617 | 10/1961 | Burdick et al. |
| 4,202,466 | 5/1980 | Cook. |
| 4,336,852 | 6/1982 | Hirano .................. 177/25 |
| 4,441,567 | 4/1984 | Hirano .................. 177/25 |
| 4,442,911 | 4/1984 | Fukuda ................. 177/165 |
| 4,444,282 | 4/1984 | Kawanishi ............. 177/25 |

FOREIGN PATENT DOCUMENTS

| | | | |
|---|---|---|---|
| 2077067 | 5/1980 | United Kingdom | 177/25 |
| 2065400 | 6/1981 | United Kingdom | 177/165 |
| 2067861 | 7/1981 | United Kingdom | 177/25 |

Primary Examiner—E. A. Goldberg
Assistant Examiner—Patrick W. Foster
Attorney, Agent, or Firm—Staas & Halsey

[57] ABSTRACT

A combinatorial weighing system for combinatorially weighing articles by obtaining an optimum combination of weight values produced by a plurality of weighing machines each of which contains a supply of the articles. The system includes a circuit for detecting a malfunction in any of the weighing machines, and a circuit for excluding weighing machines, detected as having malfunctioned, from participation in combinatorial weighing, and for executing combinatorial weighing using weighing machines other than the excluded weighing machine. When the number of excluded weighing machines exceeds a predetermined number, however, the weighing operation is halted. Even if several of the weighing machines malfunction, therefore, operation is allowed to continue, without terminating the overall weighing operation.

5 Claims, 6 Drawing Figures

COMBINATORIAL WEIGHING METHOD AND APPARATUS THEREFOR

BACKGROUND OF THE INVENTION

This invention relates to a combinatorial weighing system and, more particularly, to a combinatorial weighing system wherein a combinatorial weighing operation can continue, without suspension, even if some of the weighing stations constituting the system malfunction.

A combinatorial weighing apparatus has a plurality of weighing machines each consisting of a weighing hopper and a weight sensor associated with the weighing hopper. According to a known combinatorial weighing method, combinatorial weighing is carried out by weighing articles which have been introduced into the weighing hoppers of the weighing machines, selecting the combination of weighing machines (referred to as the "optimum" combination) containing articles that give a total weight value equal to a target weight value or closest to the target weight value within preset allowable limits, discharging only those articles contained by the weighing hoppers of the selected weighing machines, and subsequently replenishing the emptied weighing hoppers with articles to prepare for the next weighing cycle. The foregoing sequence of steps is repeated to automatically carry out a continuous, highly accurate weighing operation.

FIGS. 1 and 2 are views useful in explaining a combinatorial weighing apparatus for practicing the foregoing weighing method, in which FIG. 1 is a schematic view of the weighing mechanism, and FIG. 2 is a block diagram of a combination control unit. Numeral 11 in FIG. 1 denotes a main feeder of vibratory conveyance type. Articles to be weighed are introduced into the main feeder 11 and imparted with vibratory motion for a predetermined length of time so as to be dispersed radially outward from the center of the main feeder. Each numeral 12 denotes n-number of weighing stations which are arranged around the main feeder 11 along radially extending lines to receive the articles dispersed by the main feeder. Each weighing station 12 includes a dispersing feeder 12a, a pool hopper 12b, a pool hopper gate 12c, a weighing hopper 12d, a weight sensor 12e, and a weighing hopper gate 12f. The dispersing feeder 12a comprises an independently vibrating conveyance device for feeding the articles by means of vibration, or an independently operable shutter arrangement. In either case, each dispersing feeder 12a is so arranged that an amount of articles received from the centrally located main feeder 11 can be introduced into the corresponding pool hopper 12b disposed therebelow. The pool hopper gate 12c is provided on each pool hopper 12b in such a manner that the articles received in the pool hopper 12b are released into the weighing hopper 12d when the pool hopper gate 12c is opened. Each weighing hopper 12d is provided with a weight sensor 12e of its own. The weight sensor 12e is operable to measure the weight of the articles introduced into the corresponding weighing hopper, and to apply an electrical signal indicative of the measured weight to the combination control unit shown in FIG. 2. The combination control unit then selects the combination of articles (the "optimum" combination) which gives a total weight closest to the target weight value, as will be described below in further detail. Each weighing hopper 12d is provided with its own weighing hopper gate 12f. A drive control unit, shown in FIG. 2, upon receiving the signals from each of the weight sensors, produces a signal to open only the weighing hopper gates 12f of those weighing hoppers 12d that give the optimum combination. The selected gates 12f discharge the articles from the corresponding weighing hoppers 12d into a common chute 13 where they are collected together. The collecting chute 13 has the shape of a funnel and is so arranged as to receive the articles from any of the circularly arrayed weighing hoppers 12d via the hopper gates 12f, which are located above the funnel substantially along its outer rim. The articles received by the collecting chute 13 are collected at the centrally located lower end thereof by falling under their own weight or by being forcibly shifted along the inclined wall of the funnel by a mechanical scraper or the like, which is not shown. The collecting chute 13 is provided with a timing hopper 14 at the lower end thereof for temporarily holding the collected articles. The arrival of an externally applied signal from a packaging machine or the like causes the timing hopper 14 to release the retained articles from the system.

Reference will now be made to the block diagram of FIG. 2 for a description of the combination control unit. Numeral 20 denotes the combination control unit which includes an n-bit (n=10) counter 21 for counting timing pulses TP of a predetermined frequency, and for generating all combinations of n-number of the weighing hoppers. These combinations will also be referred to as "combination patterns" where appropriate. Specifically, for n-number of weighing hoppers, n combinations are possible when each combination is composed of one weighing hopper from the total of n weighing hoppers, $n(n-1)/2!$ combinations are possible when each combination is composed of two weighing hoppers selected from the total, and, in general, $n(n-1)(n-2) \ldots (n-r+1)/r!$ combinations are possible when each combination is composed of r-number of weighing hoppers selected from the total of n weighing hoppers. Accordingly, when the n-bit binary counter 21 has counted $2^n-1$ timing pulses TP, a total of $2^n-1$ different bit patterns, from 000 . . . 001 to 111 . . . 111, will have been generated. Therefore, if correlation is established between the first bit and the first weighing hopper, between the second bit and the second weighing hopper, and between third through n-th bits and the third through n-th weighing hoppers, then the generated bit pattern will be an indication of the abovementioned combination pattern.

A multiplexer 22, in accordance with the output bit pattern of the counter 21, provides an arithmetic unit 26 with read values (indicative of the weight of the article batches) from the weight sensors 12e of predetermined weighing hoppers. For instance, if the value of the count (the bit pattern) in counter 21 is 1000101011 when n=10, then the arithmetic unit 26 will receive the weight value outputs W1, W2, W3, W4, W6 and W10 from the weight sensors 12e attached to the first, second, fourth, sixth and tenth weighing hoppers, respectively. A target weight register 23, for storing a target weight value $W_a$, is connected to the arithmetic unit 26 to apply $W_a$ thereto. Numerals 24 and 25 denote upper and lower limit setting devices, respectively, for storing preset allowable limits (namely an upper limit or maximum value Ma, and a lower limit or minimum value Mi, respectively) which are desirable for weight values. The minimum value Mi is set equal to the target weight value, as is customary. If it were set lower than the target weight value, the result could be delivery of articles having a total weight less than that intended, and complaints might ensue.

The arithmetic unit 26 computes and delivers a signal indicative of the total weight $\Sigma Wi$ ($=X$) of the weight values received from the multiplexer 22, and also computes the difference between the total weight $\Sigma Wi$ and the preset value Wa. The arithmetic unit 26 produces a signal A indicating the absolute value of the computed difference. More specifically, the arithmetic unit 26 performs the operations:

$$\Sigma Wi = X \qquad (1)$$

$$|\Sigma Wi - Wa| = A \qquad (2)$$

and produces a signal representing the total weight $\Sigma Wi$ ($=X$), as well as a signal A representing the absolute value (hereafter referred to simply as the "deviation") of the difference between the total weight $\Sigma Wi$ and the preset value Wa. The value X is applied to a comparator 27, whose output is connected to a proper weight counter 28. The comparator 27 discriminates whether the total weight value X lies in the range defined by Mi and Ma. Specifically, if the following relation holds:

$$Mi \leq X \leq Ma \qquad (3)$$

then the comparator 27 will increment (count up) the counter 28 by one. A minimum deviation register 29 for storing the minimum deviation is set automatically to the deviation A the first time only, and thereafter is updated as the conditions warrant, as will be described later. In the case where the minimum value Mi is set equal to the preset value, it is permissible to initially set the minimum deviation register 29 to the difference between the maximum value Ma and the preset value. An optimum combination memory 30 is adapted to store the optimum combination pattern. Numerals 31 and 32 denote gates. When the total weight value $\Sigma W_i$ is within the preset allowable limits, a comparator 33 compares the deviation value A, namely the output of the arithmetic unit 26, with the prevailing minimum deviation value, denoted by B, stored in the minimum deviation register 29. When the inequality $A < B$ holds, the output of comparator 33 is such that the deviation value A is delivered for storage to the minimum deviation register 29 through the gate 31, and the content (combination pattern) of counter 21 is delivered for storage to the optimum combination memory 30.

When the state of counter 28 is one or more, a drive control unit 34, which receives a signal from memory 30 indicative of the optimum combination pattern, is operable to open the weighing hopper gates 12f (FIG. 1) specified by the optimum combination pattern, so that the corresponding weighing hoppers discharge their articles into the collecting chute 13, and to open the corresponding pool hopper gates 12c so that the emptied weighing hoppers 12d may be replenished with articles.

The operation of the weighing apparatus will now be described. At the beginning, each of the pool hoppers 12b and weighing hoppers 12d contains a supply of the articles. The weight sensors 12e provided on the corresponding weighing machines measure the weights of the articles within the respective weighing hoppers and produce the weight values W1 through W10 which are sent to the combination control unit 20. The n-bit ($n=10$) counter 21 counts the timing pulses TP having the predetermined frequency to produce $2^n - 1$ combination patterns. Thus, when the first timing pulse TP arrives and is counted, the content of counter 21 becomes 0000000001. As a result, the multiplexer 22 sends the first weight value signal W1, from the weight sensor 12e provided on the first weighing hopper, to the arithmetic unit 26, which responds by performing the operation specified by Eqs. (1) and (2) above, thereby producing the total weight value $\Sigma Wi$ of the combination, as well as the deviation A ($=|W1-W_a|$) between the total weight value $\Sigma Wi$ and the target weight value Wa. Since the gates 31 and 32 will be open for the initial combinatorial computation, the deviation value A is transferred to and stored in the minimum deviation register 29, and the content (the combination pattern 0000000001) of n-bit counter 21 is stored in the optimum combination memory 30. Comparator 27 compares the total weight $\Sigma Wi$ ($=X$) against the maximum value Ma and the minimum value Mi, and increments the proper counter 28 when the relation $M_i \leq X \leq M_a$ holds. Thenceforth, when the second timing pulse TP is generated, the pulse is counted by counter 21, whose state (combination pattern) is incremented to 0000000010. Consequently, the weight value output W2 of the weight sensor 12e provided on the second weighing hopper is delivered to the arithmetic unit 26 which then performs the operations of equations (1) and (2) to produce the signals indicative of the total weight $\Sigma Wi$ ($=X$) and of the deviation value A ($A=|W2-Wa|$). The comparator 27 then determines whether relation (3) is satisfied; if it is, then the state of the proper weight counter 28 is incremented by one. The comparator 33, meanwhile, compares the deviation value A with the state B ($=|W1-Wa|$) of the minimum deviation register 29. If the relation $A \geq B$ holds, then neither the register 29 nor the optimum combination memory 30 is updated; if $A < B$ holds, the deviation value A is transferred to and stored in register 29, and the state of counter 21 is transferred to and stored in the optimum combination memory 30. The operation described above is repeated until all $2^n - 1$ combinations have been generated. At such time the content of the minimum deviation register 29 will be the minimum deviation value obtained from the $2^n - 1$ combinations, and the content of the optimum combination memory 30 will be the combination pattern that gave the minimum value. The optimum combination is thus selected from the total of $2^n - 1$ possible combination patterns.

If the value of the count in counter 28 is one or more, the drive control unit 34 opens the weighing hopper gates 12f of weighing machines corresponding to the "1" bits of the input combination pattern (namely the optimum combination pattern), whereby the articles in these weighing hoppers constituting the optimum combination are discharged into the collecting chute 13, after which the drive control unit 34 opens the corresponding pool hopper gates 12c to replenish the emptied weighing hoppers 12d with articles. Further, the dispersing feeders 12a corresponding to the emptied pool hoppers are vibrated for a fixed length of time to resupply these pool hoppers with articles.

This completes one combinatorial weighing cycle, which may be repeated as often as required, to provide batches of the articles, each batch having a total weight equal or closest to the preset value. It should be noted that when the state of the proper weight counter 28 is zero in the foregoing operation, articles are not discharged and each of the weighing machines must be supplemented with articles to resume the combinatorial computations.

With the above-described combinatorial weighing method, even articles which exhibit a great difference in weight from one to another can be weighed out to within an error that is less than the article unit weight, thereby making it possible to achieve a highly accurate weighing operation.

In an automatic weighing apparatus of the aforementioned combinatorial type in which combinations are formed among N weight values, $2^N-1$ combinations are obtained, as already described. It is known that satisfactory accuracy can be achieved if N is a value from seven to ten when weighing such articles as ordinary agricultural products, fishery products, industrial parts, foodstuffs and fabricated products.

The number of combinations necessary to obtain a desirable accuracy depends upon such factors as the required accuracy, the nature of the articles and the manner in which the articles are supplied. Depending on these factors, there are cases where an automatic weighing apparatus having, say, ten weighing stations can weigh out articles to a satisfactory accuracy even when some of the weighing stations are not used. In other words, there are situations where there is no marked decline in accuracy even if the number of combinations formed is reduced to approximately half, as would be the result if N were diminished by one. This means that if a certain weighing station were to develop a malfunction, weighing could, in certain circumstances, continue without using the faulty weighing station.

When a specific weighing station malfunctions, the prior-art practice is to issue an alarm and suspend the operation of the weighing machines. If the problem can be remedied without excessive delay, then the automatic weighing operation may be resumed following the necessary repairs. Where the problem is such that immediate repair is not possible, the operator manipulates a so-called "non-participation" switch to exclude the faulty weighing station from the weighing operation. Even if several of the weighing stations malfunction, therefore, the conventional method allows the weighing operation to be resumed without shutting down the weighing apparatus. Nevertheless, suspending the overall weighing operation, even temporarily, has an adverse effect of major proportions on the production line equipment preceding and following the weighing apparatus, and results in diminished weighing efficiency.

Accordingly, it has been contemplated to merely present some indication of weighing stations detected as having malfunctioned, while allowing weighing to proceed without any suspension in operation. However, a problem that arises with this technique is that the combinatorial weighing computations do not provide satisfactory results when the malfunctioning weighing stations grow large in number. In other words, an excessive number of combinations provide total weight values that fall outside the allowable limits, the end result being a weighing operation having poor accuracy.

SUMMARY OF THE INVENTION

Accordingly, an object of the present invention is to provide a combinatorial weighing system in which a combinatorial weighing operation need not be suspended even when a malfunction is discovered in several of the weighing stations. The weighing operation is allowed to continue using the weighing stations that remain following the exclusion of the faulty weighing stations, whereby weighing can be carried out with excellent efficiency.

Another object of the present invention is to prevent a situation wherein a combinatorial weighing operation is allowed to continue despite inaccurate results. This object is achieved by automatically suspending the overall weighing operation when weighing stations, determined as being unsuited for participation in the weighing operation because of a malfunction, exceed a predetermined number.

According to the present invention, the foregoing objects are attained by providing a combinatorial weighing system wherein output values from weight sensors provided on respective ones of a plurality of weighing machines are monitored to determine whether each weighing machine to which a weight sensor belongs, is suited for participation in combinatorial weighing. Weighing machines determined to be unsuited for participation are excluded from the combinatorial weighing operation, and combinatorial computations are performed based solely on the remaining weighing machines. When the number of weighing machines excluded exceeds a predetermined number, however, the weighing operation is halted.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Reference will now be had to the accompanying drawings to describe embodiments of the present invention.

Figure 3:
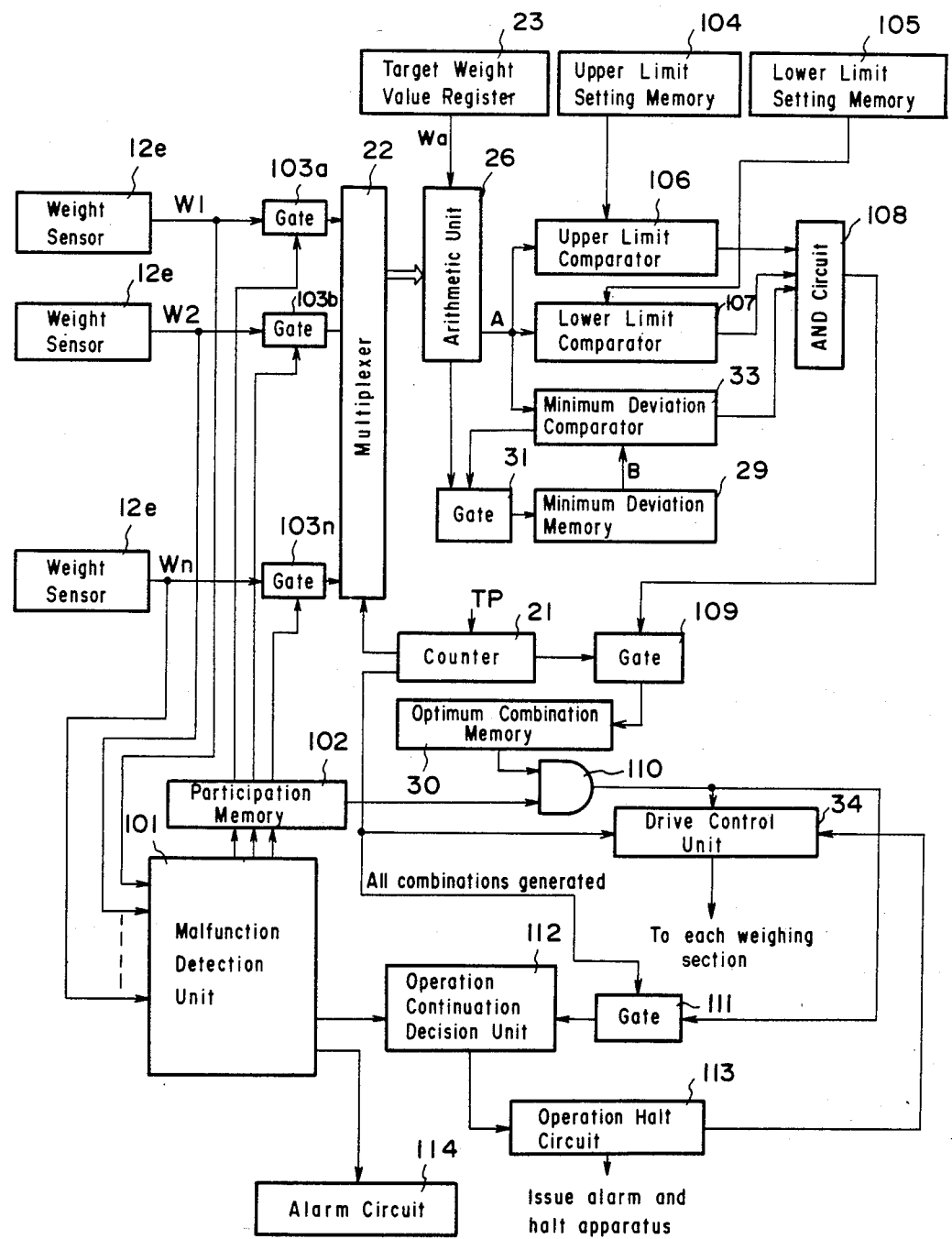
FIG. 3 is a block diagram of an embodiment of a combinatorial weighing apparatus according to the present invention.

A first embodiment of a combinatorial weighing apparatus according to the invention is illustrated in the block diagram of FIG. 3. We will assume that the apparatus has N weighing stations.

Figure 4:
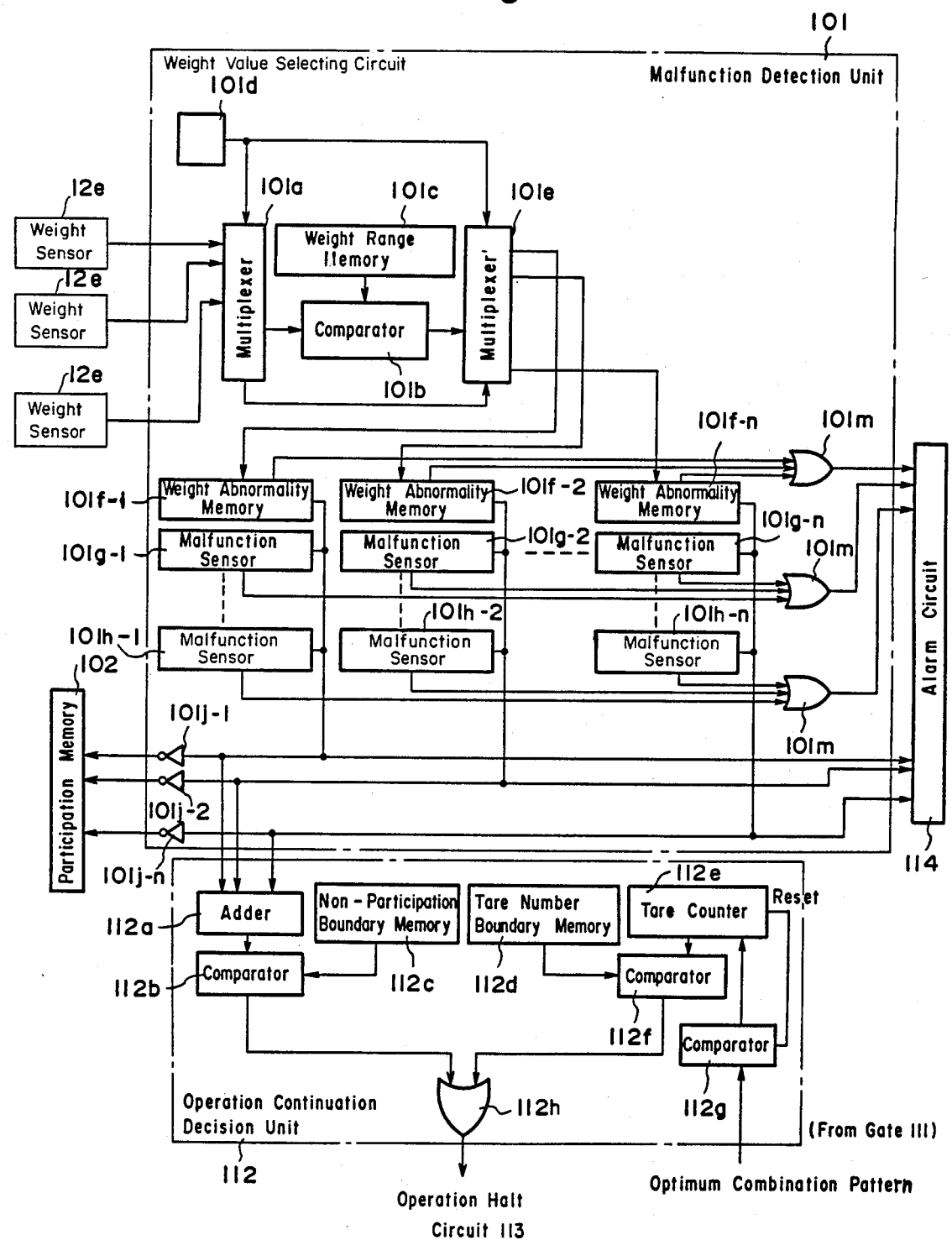
FIG. 4 is a block diagram of a malfunction detection unit and operation continuation decision unit in the apparatus of FIG. 3.

The combinatorial weighing apparatus includes a malfunction detection unit 101 which, as will be described later in greater detail with reference to FIG. 4, is adapted to detect any malfunction that may develop in the weighing stations, the type of malfunction, and the weighing station in which the malfunction has occurred. A participation memory 102 comprises an N-bit memory for storing an N-bit signal received from the malfunction detection unit 101. The bit positions of the N-bit signal correspond to respective ones of the N weighing stations, and those bit positions raised to logical "1" represent the corresponding weighing stations that are capable of participating in a combination. The weight sensors 12e each produce an electric signal indicative of the weight of the articles contained in the weighing hopper of the corresponding weighing station. These weight value signals, designated W1, W2, ... Wn (n=N), are applied to respective gates 103a, 103b, ... 103n. The latter, which are normally in the closed, i.e., disabled, state, correspond to the N bits of the participation memory 102 and are connected to the memory such that when the i-th bit of the participation memory 102 is logical "1", the i-th gate 103i will be enabled (opened) to deliver the weight value signal from the i-th weight sensor 12e to the multiplexer 22. The multiplexer 22, based on the bit pattern received from the counter (pattern generator) 21, delivers the weight values W1, W2, ... Wn successively to the arithmetic unit 26.

The target weight value register 23 sets and stores the target weight value Wa, and applies the value to the arithmetic unit 26 where the value is subtracted from the total of the weight values W1 through Wn. An upper limit setting memory 104 and a lower limit setting memory 105 set and store the upper and lower limits of a desired range of values to be weighed out, the upper and lower limit values being delivered to upper and lower limit comparators 106 and 107, respectively.

The arithmetic unit 26 computes the difference A between the target weight value Wa from register 23 and the total of the weight values W1, W2, ... Wn received from the multiplexer 22. If the output A of the arithmetic unit 26 is equal to or smaller than the contents (upper limit value) of the upper limit setting memory 104, the upper limit comparator 106 delivers a logical "1" signal to an AND circuit 108. If the output A of the arithmetic unit 26 is equal to or greater than the contents (lower limit value) of the lower limit setting memory 105, the comparator 107 delivers a logical "1" signal to the AND circuit 108. The minimum deviation memory 29 stores the currently prevailing minimum deviation, and is adapted to read in the output of the arithmetic unit 26 when a gate 31 is enabled, whereby the state of the memory 29 is updated. The minimum deviation comparator 33 compares the absolute value of the output A from the arithmetic unit 26 with the contents B of the minimum deviation memory 29, enabling the gate 31 and delivering a logical "1" signal to the AND circuit 108 when the absolute value of the signal A is smaller than B.

The AND circuit 108, whose output is connected to the input of a gate 109, takes the AND of the signals received from the upper limit comparator 106 the lower limit comparator 107 and the minimum deviation comparator 33. The gate 109 is enabled when its input from the gate circuit 108 is logical "1". The counter 21, serving as a combination pattern generator, generates combination patterns each composed of N bits. If N=10, the counter will generate $2^n - 1$ patterns successively, from 0000000001 to 1111111111. The i-th bit of each pattern corresponds to the i-th weighing machine. For example, if the counter 21 produces a bit pattern 1001001101, where N=10, then the multiplexer 22 will provide the arithmetic unit 26 with weight values W1, W3, W4, W7 and W10. When the gate 109 is enabled, the optimum combination memory 30 accepts the contents of the counter 21, whereby the memory is updated.

Numeral 110 denotes an AND circuit for ANDing the data in the participation memory 102 and the data in the optimum combination memory 30, the output of the AND circuit 110 being connected to the drive control unit 34 and a gate 111. The drive control unit 34 controls the weighing machines corresponding to the "1" bits in the output of the AND circuit 110, whereby these weighing machines are opened and closed, supplied with articles and caused to discharge their articles, etc. The gate 111 is enabled when it receives a signal from the counter 21 indicating that all combinations have been generated, thereby delivering the output of the gate circuit 110 to an operation continuation decision unit 112.

The operation continuation decision unit 112, which will be described in detail below, decides whether it is possible to continue with a weighing operation, the decision being based on a signal from the malfunction detection unit 101 indicating the status of a malfunction, and on information representing the results of a weighing operation, received from the gate 111. If it is decided that weighing should not continue, the decision unit 112 sends a signal to an operation half circuit 113. The latter is adapted to issue an alarm, such as by activating a lamp or buzzer, and to send a drive inhibit signal to the drive control unit 34. It should be noted that maintenance can be facilitated by providing a lamp for each weighing station, each lamp indicating whether the corresponding weighing station is participating, i.e., operating normally, or not participating, i.e., malfunctioning. An alarm circuit 114 serves as a monitor and, in response to a signal received from the malfunction detection unit 101, produces an output indicative of the malfunctioning weighing station and of the type of malfunction.

Reference will now be had to FIG. 4 to describe the details of the malfunction detection unit 101 and operation continuation decision unit 112. The malfunction detection unit 101 includes multiplexers 101a and 101e, a comparator 101b, a weight range memory 101c a weight value selecting circuit 101d, weight abnormality memories 101f—1, 101f—2, ... 101f—n provided on corresponding ones of the weight sensors, first malfunction sensors 101g—1, 101g—2, ... 101g—n through m-th malfunction sensors 101h—1, 101h—2, ... 101h—n provided at suitable locations in respective ones of the weighing stations, inverters 101j—1 through 101j—n, and OR gates 101m. The multiplexer 101a successively receives the weight values W1, W2, ... Wn produced by the weight sensors 12e and delivers these weight values to the comparator 101b in successive fashion. The weight range memory 101c stores a weight range on the basis of which a judgment can be made as to whether a weight sensor is in a normal condition. As an example, if an output from a weight sensor exceeds a zero region after a discharge command has been sent to its associated weighing hopper, then this may be taken as indicating that some of the articles have become jammed within the weighing hopper following discharge. On the other hand, if a large negative value is obtained, this can indicate that a weighing hopper has been removed, as for cleaning, without having been replaced. The comparator 101b compares the weight value delivered by the multiplexer 101a with the contents of the weight range memory 101c, and produces a logical "1" signal when the weight value falls outside of the stored range. It should be noted that the weight range memory 101c stores two ranges. The first is a normal weight range (referred to as the zero range) that prevails when a weighing hopper is devoid of articles. The second is a normal weight range (referred to as usage range) that prevails when articles have been introduced into the weighing hopper. The comparator 101b, in coordination with the weighing cycle, determines whether the output value from each weight sensor 12e is within the zero range or usage range, producing the logical "1" signal when the output is outside the range. The weight value selecting circuit 101d supplies the multiplexer 101a with a selection signal for selecting a predetermined weight sensor. The multiplexer 101e, which is operatively associated with the multiplexer 101a, delivers the output of the comparator 101b to the weight abnormality memories 101f−1, 101f−2, ... 101f−n in succession. Specifically, the result obtained by checking the i-th weight sensor 12e−i enters the i-th weight abnormality memory 101f−i. The first malfunction sensors 101g−1, 101g−2, ... 101g−n through m-th malfunction sensors 101h−1, 101h−2, ... 101h−n are provided at prescribed positions of respective ones of the weighing stations, each of these sensors producing a "1" output when a malfunction is sensed in the corresponding weighing station. For each weighing station, the output of the corresponding weight abnormality memory and the outputs from the corresponding malfunction sensors are subjected to an OR operation. In addition, the outputs from all malfunction sensors of the same type (such as the first malfunction sensors 101g−1 through 101g−n) are subjected to an OR operation by a corresponding one of the OR gates 101m. The resulting signals relating to the respective weighing stations are delivered to an alarm circuit 114, as well as to the participation memory 102 through respective inverters 101j−1, 101j−2, ... 101j−n. Further, the resulting signals relating to sensors of the same type are delivered to the alarm circuit 114 through the respective OR gates 101m.

The operation continuation decision unit 112 in FIG. 4 comprises an adder 112a, a comparator 112b, a non-participation boundary memory 112c, a tare number boundary memory 112d, a tare counter 112e, comparators 112f, 112g, and an OR gate 112h. The adder 112a adds the number of "1"s that result from ORing the malfunction signals of each weighing station. The non-participation boundary memory 112c stores the number of weighing stations (from among the number N thereof) that, if no longer usable, would make it impossible to continue the weighing operation because of an inadequate number of available combinations. The comparator 112b compares the value in the adder 112a with the value in the non-participation boundary memory 112c and produces a "1" output when the value in the adder 112a is larger. The comparator 112g receives the output of the gate 111 (FIG. 3). If a combination has been formed (i.e., if the bits are not all "0"), the comparator 112g clears the contents of the tare counter 112e to zero. When no combination is formed (i.e., all bits are "0"), the tare counter 112e is incremented by one step. The tare number boundary memory 112d stores a value representing how many consecutive times a combination must fail to be formed (i.e., how many times a combination fails to give a total weight value with the desirable limits) to make continuation of weighing impossible.

The operation of the invention will now be described with reference to FIGS. 3 and 4.

The weighing hopper in each weighing station contains a supply of the articles, introduced from the immediately preceding stage of the apparatus, and the weight sensors 12e produce the weight values W1, W2, ... Wn. Let us assume that a malfunction causes the weight value W1 to exceed the range set in the weight range memory 101c, and that a malfunction sensor in the first and third weighing stations produces a "1" output. Under these conditions, the inverters 101j−1 and 101j−3 deliver outputs of logical "0", so that a bit signal expressed by 1111111010, indicating that the first and third weighing stations are unusable, is applied to the participation memory 102. The logic in each bit of the participation memory 102 is applied to the corresponding gates 103a, 103b, ... 103n, with the result that the first and third of these gates are disabled, the others being opened.

The first pattern produced by the counter 21 is 0000000001. The multiplexer 22 is adapted to accept, and deliver to the arithmetic unit 31, the signals from the gates 103a, 103b, ... corresponding to the "1" bits produced by the counter 21. Since the first gate 103a is disabled by the output from the participation memory 102, as described above, the output W1 of gate 103a is, in effect, zero. This is the value accepted by the multiplexer 22 and applied to the arithmetic unit 26. The gate 31 initially is open, so that the difference between W1 (=0) and the target weight value, computed by the arithmetic unit 26, is delivered to the minimum deviation memory 29. At this time, the output A of the arithmetic unit 26 is checked by the upper and lower limit comparators 106 and 107 to determine whether it falls within proper limits; if it does, then the comparators 106 and 107 apply logical "1" signals to the AND circuit 108.

With the generation of the next timing pulse TP, the state of the counter 21 is raised to 0000000010, the multiplexer 22 delivers the weight value W2 to the arithmetic unit 26 through the open gate 103b, the computed value A is compared against the contents of the upper and lower limit comparators 106 and 107, and the comparators apply the results of the comparison to the AND circuit 108. The minimum deviation comparator 33 compares the output A of the arithmetic unit 26 with the contents B of the minimum deviation register 29 and enables the gate 31 if A is smaller, whereby A is fed into the minimum deviation memory 29. The comparator 33 also applies a "1" signal to the AND circuit 108. Thereafter, the state of counter 21 is incremented by the generation of the next timing pulse TP, 0000000011 is produced as the output combination pattern, and processing proceeds just as described above. Eventually, the counter 21 will produce a 1111111111 combination pattern. When the related processing has been performed, one combinatorial computation cycle ends. When an output A from the arithmetic unit 26 falls within the set limits and, moreover, A<B is found to hold during the processing for the combinatorial computation cycle, the output of the AND circuit 108 goes to logical "1" to enable the gate 109. When this occurs, the state of the counter 21 is fed into the optimum combination memory 30. When the final pattern 1111111111 is generated by the counter 21 and the related processing is completed, the counter 21 provides the gate 111 and the drive control unit 34 with a signal indicating that all combinations have been produced. At such time, the combination pattern contained in the optimum combination memory 30 will be that giving a total weight value closest to the target value within the desired weight limits. The drive control unit 34 AND the contents of the optimum combination memory 30 and the contents of the participation memory 102, and applies a drive command to the weighing stations on the basis of the results of the AND operation. For example, if the combination stored in the optimum combination memory 30 is 1011011101, then the output of the AND circuit 110 is 1011011000. As a result, a discharge command will be applied to the fourth, fifth, seventh, eighth and tenth weighing stations.

In the event that a large number of the weighing stations malfunction so that a combination giving a desirable combined weight value does not exist owing to an inadequate number of available combinations, the output of the AND circuit 108 will never rise to logical "1" during the entire combinatorial computation process. In consequence, when the counter 21 produces the signal indicating that all combinations have been generated, all bits in the optimum combination memory 30 will be "0". As a result, the tare counter 112e in the operation continuation decision unit 112 is incremented by one count. If the number of weighing stations rendered useless by a malfunction exceeds a set value, or if the count in the tare counter 112e exceeds a set value, then comparator 112b or 112f will produce a "1" output, which is applied to an OR gate 112h. The OR gate 112h will deliver this signal to the operation half circuit 112 as an operation halt command. In response, the circuit 113 halts the operation of the apparatus.

Therefore, according to the present invention, if some of the N weighing stations of the weighing apparatus should become unusable because of a malfunction, the weighing operation is allowed to continue while automatically determining whether desirable weighing results are being obtained in a situation where the number of malfunctioning weighing stations does not exceed a set value. This makes it possible to reduce occassions in which production activity is upset by the occurrence of a malfunction.

Figure 1:
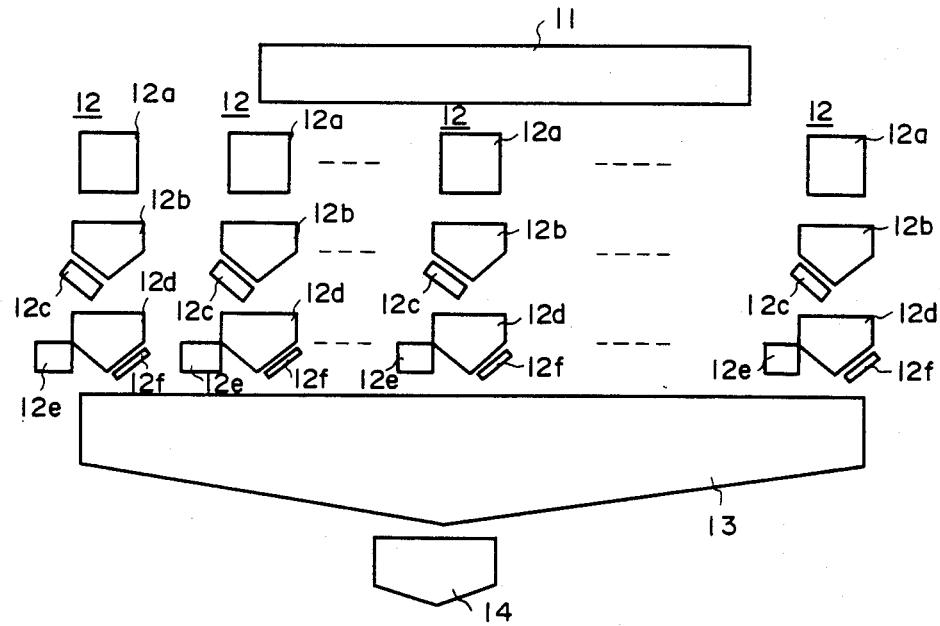
FIG. 1 is a schematic view of the weighing mechanism of a combinatorial weighing apparatus according to the prior art.
Figure 2:
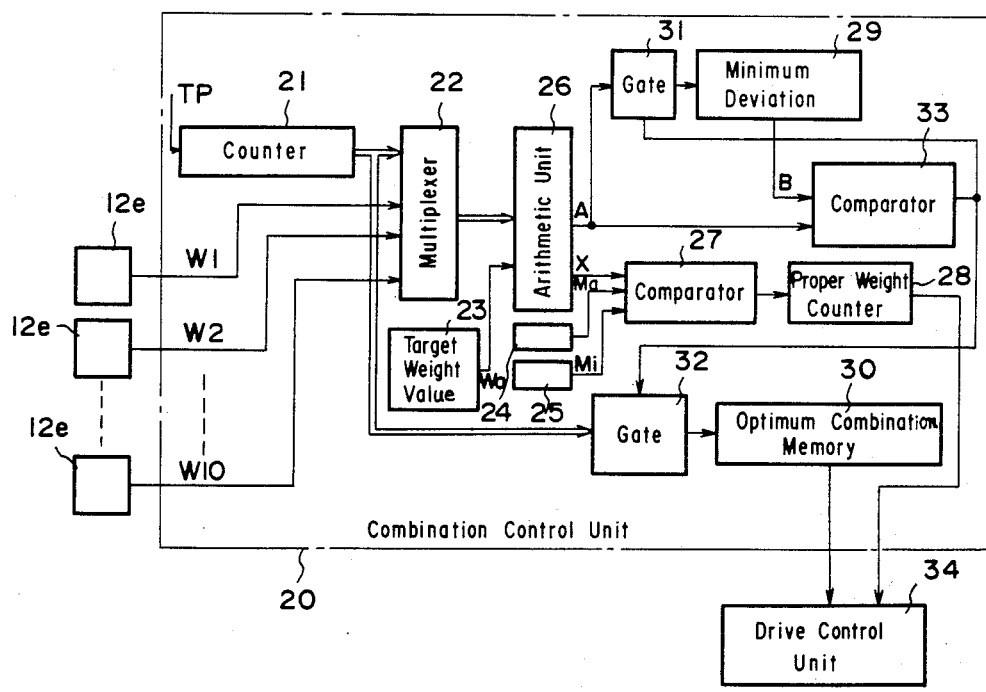
FIG. 2 is a block diagram of a combination control unit in the weighing apparatus of the prior art.

The malfunction sensors $101g-1, \ldots 101g-n; \ldots 101h-1, \ldots 101h-n$ mentioned above are of various kinds, examples of which are as follows:

(a) A sensor for detecting whether electric current is flowing into an electromagnet during drive. This sensor is used in a case where the dispersing feeder 12a (FIG. 1) is of the feeding conveyance type.

(b) A limit switch or photoelectric tube provided at the ends of the stroke of a shutter for detecting whether the shutter is open or closed. This sensor is used when the dispersing feeder is of the shutter-type construction.

(c) A limit switch provided at the closing position of the pool hopper gate 12c of pool hopper 12b, and at the closing position of the weighing hopper gate 12f of weighing hopper 12d, so as to be closed when the corresponding gate is closed. This makes it possible to detect whether acticles have become jammed between the hopper and gate.

(d) In a case where a weighing hopper is opened and closed by one revolution of a cam, a radially extending slit is formed in a slit cam that rotates in unison with the first-mentioned cam. To confirm that the slit has returned to a home position, a sensor is provided for detecting a beam of light projected through the slit by a photoelectric tube. Another form of sensor is provided at the stroke end of a link lever for opening and closing a gate, the sensor detecting any abnormality in the gate opening and closing operation. Other sensors include one for measuring drive motor current to detect any overload, a temperature sensor for sensing an abnormal temperature internally of the weighing apparatus, etc.

Figure 5:
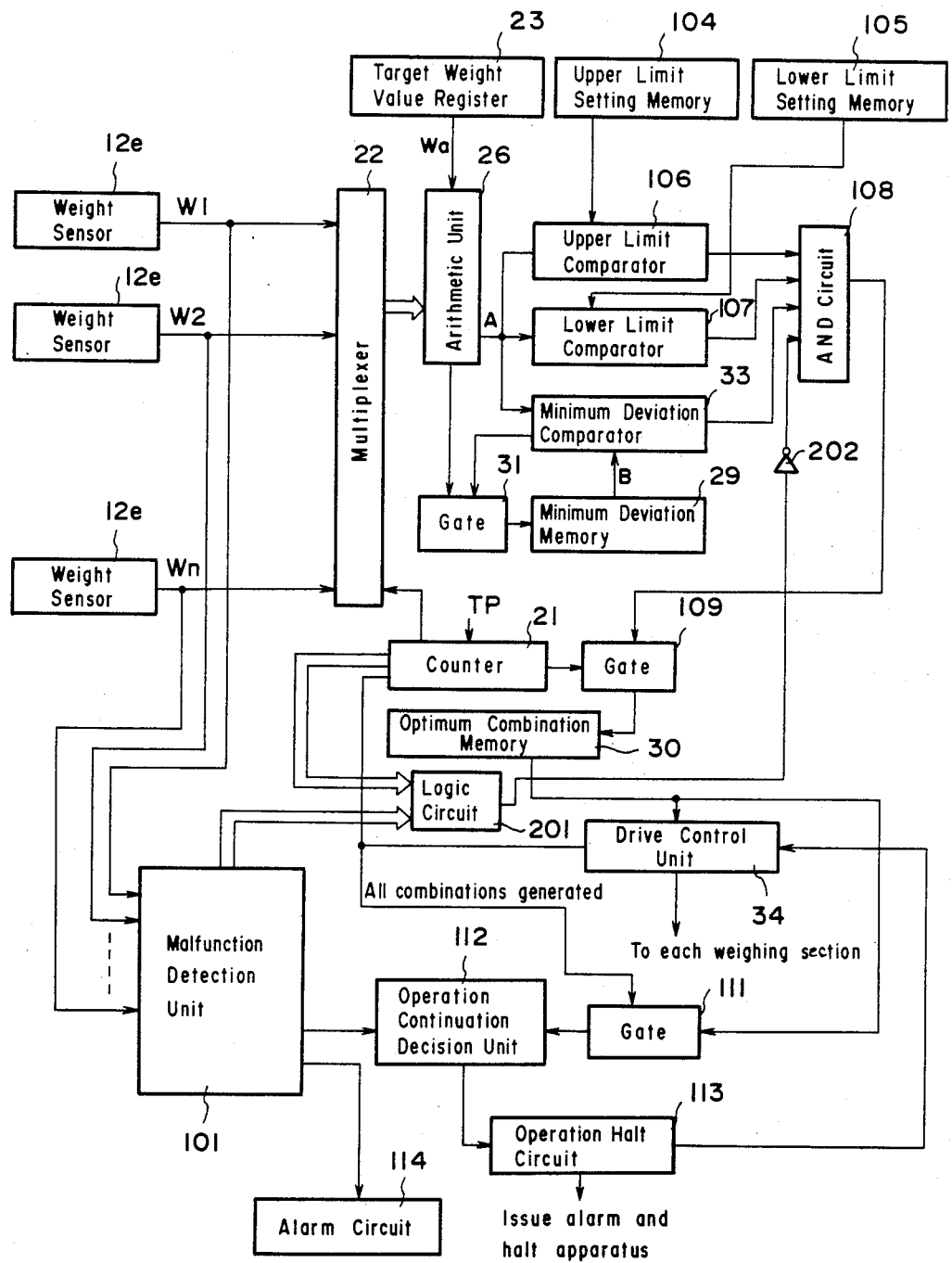
FIGS. 5 and 6 are block diagrams of second and third embodiments, respectively, of a combinatorial weighing apparatus according to the present invention.
Figure 6:
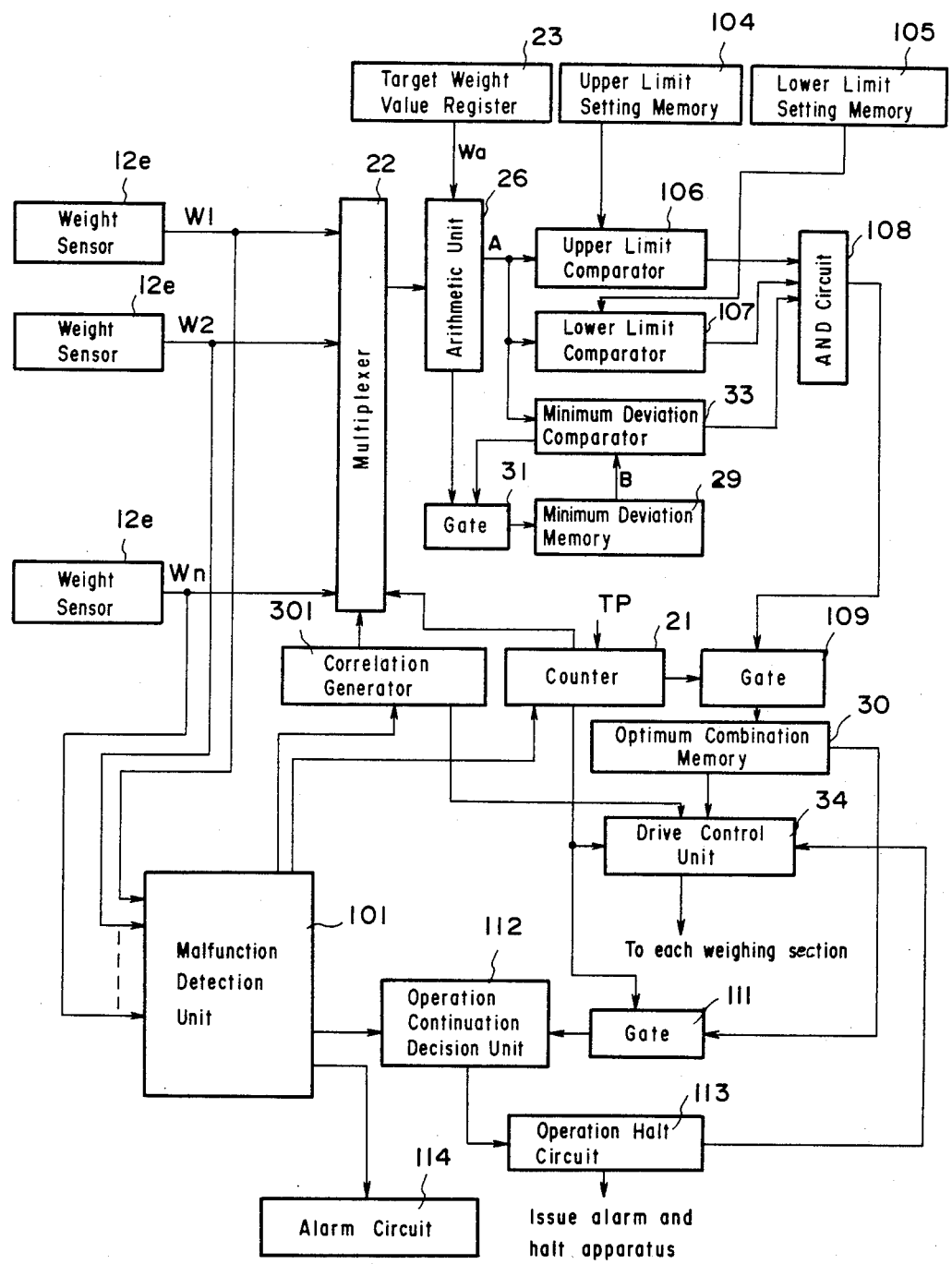

FIGS. 5 and 6 illustrate second and third embodiments of the present invention, respectively, in which portions similar to those of FIG. 3 are designated by like reference characters.

In the embodiment of FIG. 3, combination patterns are generated and combinatorial processing executed with regard to all $2^n-1$ combinations irrespective of whether certain weighing stations are usable or not. In other words, $2^n-1$ combinations are computed with the output (weight value) of an unusable weighing station being rendered zero. The AND gate 110 ANDS the optimum combination pattern, at the instant the pattern is produced, with the contents of the participation memory 102. In the embodiment illustrated in FIG. 5, however, combinations are computed without regarding the outputs of weight sensors as zero. If a weighing station, selected by a combination pattern, malfunctions, the arrangement is such that the AND circuit 108 will issue a "0" output, preventing the combination from being stored in the optimum combination memory 30, even if the relation A<B should hold. More specifically, the apparatus of the second embodiment is provided with a logic circuit 201 for computing the logical product between corresponding bits of the combination pattern prevailing in the counter 21, and the n-bit signal from the malfunction detection unit 101, and for taking the OR of the signals obtained from each logical product computation. The result ("1" or "0") is delivered to a NOT gate 202, the output whereof enters the AND circuit 108. Accordingly, if even one of the weighing stations selected by the "1" bits of a combination pattern is rendered useless by a malfunction, the output of the logic circuit 201 goes to logical "1", and logical "0" is applied to the AND circut 108, the output whereof goes to logical "0" as a result. It should be noted that the inverters $101j-1, 101j-2, \ldots 101j-n$ shown in FIG. 4 are unnecessary in the malfunction detecting unit 101 of the embodiment illustrated in FIG. 5.

In the third embodiment of the present invention, shown in FIG. 6, weighing stations that malfunction are excluded from combinatorial computations. Also, rather than there being a fixed correlation between the bit positions of the counter 21 and the weighing stations, correlation is established anew whenever a malfunctioning weighing station is excluded. By way of example, if the first and third weighing stations malfunction, then correlation is established between the first, second, third, fourth, fifth, sixth, seventh and eighth bit positions of the counter 21 and the second, fourth, fifth, sixth, seventh, eighth, ninth and tenth weighing stations, respectively, with the weighing stations corresponding to the ninth and tenth bit positions being neglected. As a result, whereas $2^{10}-1$ combination patterns would need to be generated ordinarily, it will suffice if only $2^8-1$ combination patterns are produced in the arrangement of FIG. 6. To achieve the foregoing, the apparatus of the third embodiment is provided with a correlation generator 301 which, using information pertaining to malfunctioning weighing stations, generates the correlation between the bits of counter 21 and the weighing stations.

In accordance with the present invention as described and illustrated hereinabove, a combinatorial weighing operation need not be suspended even when a malfunction is discovered in several of the weighing stations, the weighing operation being allowed to continue using the weighing stations that remain following the exclusion of the faulty weighing stations, whereby weighing can be carried out in an extremely efficient manner. The invention also prevents a situation wherein a combinatorial weighing operation is allowed to continue despite inaccurate results. This is accomplished by automatically suspending the overall weighing operation when weighing stations, determined as being unsuited for participation in the weighing operation because of a malfunction, exceed a predetermined number, or when all combinations of the weighing stations give total weight values that fall outside predetermined allowable limits n consecutive times.

Further, according to the present invention, each weight value produced by the weight sensors is monitored, and when a weight value fails to fall within a predetermined range, the weighing station, to which the corresponding weight sensor belongs, is judged to be defective. The weighing station is then automatically excluded from combinatorial computations. Therefore, if a weighing hopper should be removed for cleaning, or if a cleaned weighing hopper is not reattached to the weighing apparatus, the associated weight sensor will not introduce an excessively negative value into the computations to upset the weighing operation. Maintenance may be facilitated by providing a lamp or the like for each weighing station, the lamp indicating whether the weighing station is operating normally or not.

As described above, a weighing station is judged to be defective and is then automatically excluded from combinatorial computations whenever the corresponding weight sensor produces a weight value that is outside of the predetermined limits. Therefore, if for some reason the operator should wish to remove a weighing station from participation, means that cause the weight value to fall outside the predetermined limits may be provided. Such means can be a weight or metal fitting that forces the weight value out of said limits. The same results can be obtained by disconnecting the proper wire lead or the like. A weighing station so excluded from participation in a weighing operation may then be inspected or subjected to maintenance with facility.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method of a combinatorial weighing apparatus for executing a combinatorial computation on the basis of weight data obtained from a plurality of weighing machines and for selecting an optimum combination wieght value in accordance with the combinatorial computation, comprising the steps of:
   (a) comparing respective weight data, obtained from a plurality of weighing machines, with a predetermined range weight data;
   (b) automatically suspending the operation of the weighing machines having weight data which fall outside the range of weight data, while automatically maintaining the remaining weighing machines, excluding the suspended weighing machines, in operation; and
   (c) suspending the operation of the combinatorial weighing apparatus when the number of suspended weighing machines reaches a predetermined number.

2. A combinatorial weighing method according to claim 1, wherein said step (c) is performed when the number of remaining weighing machines is equal to the minimum number of weighing machines required for providing a combinatorial weighing operation.

3. A combinatorial weighing apparatus which successively executes an operation for obtaining an optimum combination weight value on the basis of weight data from a plurality of weighing machines, comprising:
   weight sensors installed on the plurality of weighing machines;
   weight data range storing means, operatively connected to said weight sensors, for storing a predetermined range of weight data;
   first comparing means, operatively connected to said weight sensors and said weight data range storing means, for comparing weight data obtained from said respective weight sensors with respective data stored in said weight data range storing means;
   first means, operatively connected to said weighing machines, for automatically suspending the operation of the weighing machines having weight data which falls outside said weight data range stored in said weight data range storing means, and for automatically maintaining operation of the remaining weighing machines, excluding the suspended weighing machines;
   storing means, operatively connected to said first means for automatically suspending operation of the weighing machines, for storing the number of said weighing machines which are suspended when the minimum number of the weighing machines required for maintaining a combinatorial weighing operation are operated;
   second comparing means, operatively connected to said storing means, for comparing a number of the suspended weighing machines with the number of the weighing machines stored in said storing means; and
   second means, operatively connected to said second comparing means, for suspending the operation of said combinatorial weighing apparatus when the number of the suspended weighing machines is less than or equal to the number of the weighing machines stored in said storing means.

4. A combinatorial weighing apparatus according to claim 3, further comprising means for excluding a combination of the weight data, including weight data from said weighing sensors, which fall outside the range of respective weight data stored in said weight data range storing means, from participating in a combinatorial weighing operation.

5. A combinatorial weighing apparatus according to claim 3, further comprising means for excluding the weighing machines having weight data which fall outside the range of respective weight data stored in said weight data range storing means, from participating in a combinatorial weighing.

* * * * *